(12) United States Patent
Hejl et al.

(10) Patent No.: US 12,069,229 B2
(45) Date of Patent: *Aug. 20, 2024

(54) MULTI-CAMERA IMAGE CAPTURE SYSTEM

(71) Applicant: Electronic Arts Inc., Redwood City, CA (US)

(72) Inventors: Jim Hejl, Redwood City, CA (US); Jerry Phaneuf, Seattle, WA (US); Aaron Jeromin, Seattle, WA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,422

(22) Filed: May 4, 2023

(65) Prior Publication Data

US 2023/0276040 A1    Aug. 31, 2023

Related U.S. Application Data

(60) Continuation of application No. 17/703,017, filed on Mar. 24, 2022, now Pat. No. 11,700,362, which is a
(Continued)

(51) Int. Cl.
*H04N 13/25* (2018.01)
*G01B 11/24* (2006.01)
(Continued)

(52) U.S. Cl.
CPC ........... *H04N 13/296* (2018.05); *G01B 11/24* (2013.01); *H04N 13/128* (2018.05); *H04N 13/239* (2018.05); *H04N 13/25* (2018.05); *H04N 13/254* (2018.05); *H04N 13/257* (2018.05); *H04N 13/271* (2018.05); *H04N 23/60* (2023.01); *H04N 23/69* (2023.01); *H04N 23/90* (2023.01); *A63F 13/213* (2014.09); *G01B 11/25* (2013.01); *G01B 2210/54* (2013.01)

(58) Field of Classification Search
CPC .. H04N 13/296; H04N 13/257; H04N 13/128; H04N 13/254; H04N 13/271; H04N 13/239; H04N 13/25; H04N 23/69; H04N 23/90; H04N 23/60
USPC .......................................................... 348/48
See application file for complete search history.

(56) References Cited

U.S. PATENT DOCUMENTS 3,918,810 A * 11/1975 Cohen .................... G03B 29/00
                                                         396/419
2008/0317575 A1    12/2008 Yamazaki
(Continued)

OTHER PUBLICATIONS

USPTO, Notice of Allowance for U.S. Appl. No. 15/597,827, mailed Jul. 10, 2019.
(Continued)

*Primary Examiner* — Nguyen T Truong
(74) *Attorney, Agent, or Firm* — Lowenstein Sandler LLP

(57) ABSTRACT

An image capture system includes: a first mobile unit configured to move around the target area; a second mobile unit adjustably coupled to the first mobile unit; a dual-camera unit, operatively coupled to the second mobile unit, including: a first camera to capture structural data; and a second camera to capture color data, wherein the first mobile unit and the second mobile unit are configured to move the first camera and the second camera.

20 Claims, 7 Drawing Sheets

Related U.S. Application Data continuation of application No. 16/537,943, filed on Aug. 12, 2019, now Pat. No. 11,323,690, which is a division of application No. 15/597,827, filed on May 17, 2017, now Pat. No. 10,440,353.

(51) Int. Cl.
| | |
|---|---|
| *H04N 13/128* | (2018.01) |
| *H04N 13/239* | (2018.01) |
| *H04N 13/254* | (2018.01) |
| *H04N 13/257* | (2018.01) |
| *H04N 13/271* | (2018.01) |
| *H04N 13/296* | (2018.01) |
| *H04N 23/60* | (2023.01) |
| *H04N 23/69* | (2023.01) |
| *H04N 23/90* | (2023.01) |
| *A63F 13/213* | (2014.01) |
| *G01B 11/25* | (2006.01) |

(56) References Cited

U.S. PATENT DOCUMENTS

| | | | | |
|---|---|---|---|---|
| 2014/0015929 | A1* | 1/2014 | Hong | G06T 17/00 |
| | | | | 348/46 |
| 2017/0318280 | A1* | 11/2017 | Nisenzon | H04N 13/243 |
| 2018/0130255 | A1* | 5/2018 | Hazeghi | H04N 13/243 |

OTHER PUBLICATIONS

USPTO, Office Action for U.S. Appl. No. 16/537,943, mailed Mar. 17, 2021.
USPTO, Final Office Action for U.S. Appl. No. 16/537,943, mailed Sep. 15, 2021.
USPTO, Notice of Allowance for U.S. Appl. No. 16/537,943, mailed Jan. 12, 2022.
USPTO, Office Action for U.S. Appl. No. 17/703,017, mailed Nov. 10, 2022.
USPTO, Notice of Allowance for U.S. Appl. No. 17/703,017, mailed Mar. 3, 2023.

* cited by examiner

MULTI-CAMERA IMAGE CAPTURE SYSTEM

RELATED APPLICATIONS

This application is a continuation of U.S. patent application Ser. No. 17/703,017 filed Mar. 24, 2022, which is a continuation of U.S. patent application Ser. No. 16/537,943 filed on Aug. 12, 2019, issued as U.S. Pat. No. 11,323,690 on May 3, 2022, which is a divisional of U.S. patent application Ser. No. 15/597,827 filed on May 17, 2017, issued as U.S. Pat. No. 10,440,353 on Oct. 8, 2019. The above-referenced applications are incorporated by reference herein.

TECHNICAL FIELD

The present disclosure is generally related to a dual-camera image capture system, and is more specifically related to an image scanning system for capturing a series of images with a first camera to capture structural details and a second camera to capture color details.

BACKGROUND

Structure from motion is a photogrammetric range imaging technique for digitally replicating three-dimensional (3D) structures from two-dimensional (2D) image sequences. Various structure from motion techniques utilize a correspondence between images captured from different vantage points of an object to construct a 3D digital replica from the 2D images. To find correspondence between images, features such as corner points (edges with gradients in multiple directions) are tracked from one image to the next.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
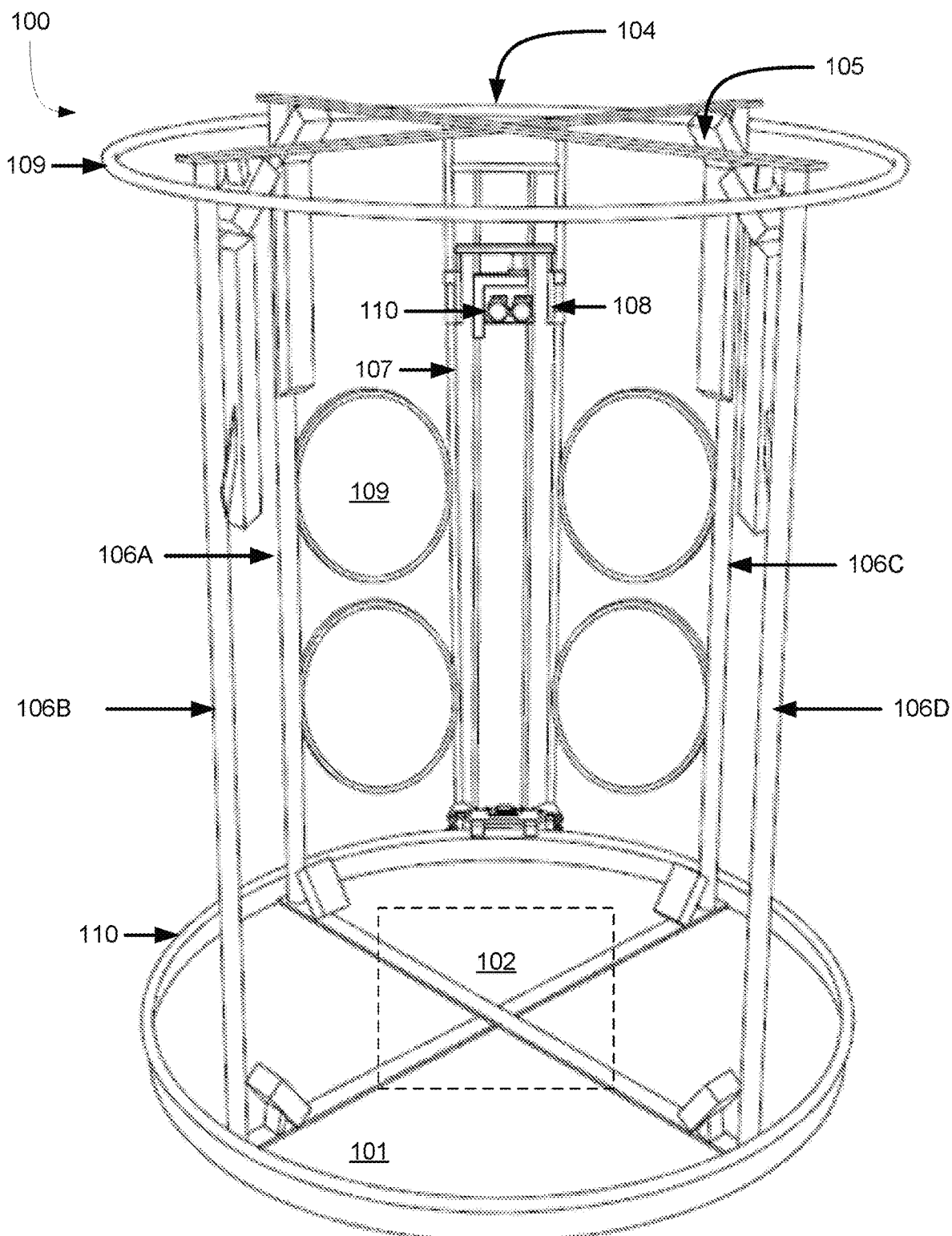
FIG. 1 is a wireframe diagram illustrating an exemplary dual-camera image capture system, according to an implementation.

Described herein are systems and methods for dual-camera image capture. Such systems and methods may allow for the capture of a series of images of a 3D object using two cameras moved (e.g., in horizontal and vertical directions) around the stationary object. The captured images may be utilized, e.g, for producing computer-generated imagery to be employed in interactive video games.

In one embodiment, structure from motion techniques may provide for capturing images of a 3D object by manually capturing images from various vantage points of the 3D object. For example, to digitally replicate a pair of sneakers, a user may walk around the sneakers to capture a series of images from various angles of the sneakers, and use correspondences (identifiable features) in the series of images to piece the images together. This embodiment may suffer from various problems including inconstant lighting, which may create micro faceting in the images. In one embodiment, micro faceting may be small edges created by the shadows of inconstant lighting on an object. Micro faceting location and intensity may vary from one image to the next, creating problems in identifying correspondences between images in a series.

In another embodiment, structure from motion techniques may provide for capturing images of a 3D object by placing the object on a turntable and using a stationary camera to capture a series of images. This embodiment may be prone to movement errors during the object scanning process, which may result in a lower quality scan, or possibly scan failure if too much deformation is present. The problem of movement errors may be especially prevalent when the 3D object to be scanned is a textile or other highly flexible deformable structure. By rotating the object on the turntable, the object may be caused to change position or shape. However slight, the movement of the object to be scanned may create differences in correspondences between images in a series, which may make it more difficult to recognize the correspondences. This embodiment may also suffer from inconstant lighting, which may create micro faceting in the resulting images.

Embodiments described herein describe operations that improve the embodiments described above, and other structure from motion techniques by capturing a series of images via a dual-camera image capture system moving around a target area (whereupon a stationary 3D object may sit) in a controlled lighting environment. Embodiments described herein may include a dual-camera image capture system including a first camera to capture structural details of an object to be scanned, a second camera to capture color details of the object to be scanned, various light sources to be used differently with the cameras, and a structure that allows the cameras and light sources to move around the object to be scanned during a scan sequence.

Advantageously, by keeping the object in place, and moving cameras around in a systematic manor, the above lighting and movement problems are solved. Additionally, by capturing structural and color details using two different cameras specifically configured for each purpose, image quality is enhanced. Furthermore, the embodiments and operations described herein improve computer functionality by producing higher quality images.

It should be noted that while the embodiments described herein may refer to specific 3D objects, the operations and systems described herein are applicable to any 3D object. It is further noted that although the embodiments described herein may, for convenience and clarity, refer to an object for scanning, the object is in no way an integral part of the dual-camera image capture system. Furthermore, scan operations described herein may be performed automatically (e.g., without human interaction).

FIG. 1 is a wireframe diagram illustrating an exemplary dual-camera image capture system, according to an implementation. In one embodiment, the dual-camera image capture system includes a dual-camera image capture structure 100. The dual-camera image capture structure 100 may include a bottom area 101, above which may be a target area 102. In one embodiment, the bottom area 101 may be a platform to support an object for scanning. Alternatively, the bottom area 101 may the floor upon which the dual-camera capture structure 100 sits. The target area 102 may be a 3D volumetric space above the bottom area 101 that is to receive an object for scanning. The target area 102 may be as large or small as permitted by the dimensions of the dual-camera image capture structure 100.

In one embodiment, the dual-camera image capture structure 100 may include a top area 104. Top area 104 may include a top panel, support beams, or other structural items to provide structural support to structure 100 and allow for the attachment of various units. In one embodiment, top area 104 includes a light source 105 directed downward, towards the target area 102. Light source 105 may be attached to top area 104 so that light source 105 remains stationary during a scan. In another embodiment, the light source 105 may be attached to any other static portions of 100. This includes structural elements down the sides vertically or at the floor level, essentially surrounding the object in a non-moving, static light environment. In one embodiment, light source 105 is one or more high-intensity strobe (flash) lights. Light source 105 may include a diffusing filter (e.g., a flash diffuser) attached to the front of one or more lights, to diffuse the light produced by the light source. The diffusing filter may have a corresponding diffusion value that indicates the amount of diffusion provided by the filter. In one embodiment, the higher the diffusion value, the greater the diffusion. In one embodiment, the diffusion filter of light source 105 may weakly diffuse the light produced by light source 105. In another embodiment, light source 105 may not include a diffusion filter. Light source 105 may include a polarization filter to polarize the light produced by the light source 105.

The dual-camera image capture structure 100 may include a side (e.g., perimeter) area. The top area 104 and bottom area 101 of structure 100 may be round in shape. In one embodiment, the side area includes the perimeter of structure 100, around the circumference of the volumetric area defined by the bottom area 101 and the top area 104. The side area may include various support units 106A-D. The support units 106A-D may be attached to the bottom area 101 and the top area 104. In one embodiment, the support units 106A-D may be attached to a floor where structure 100 is placed. Support units 106A-D may provide support for top area 104 (e.g., including a light source 105) and various other units.

In one embodiment, dual-camera image capture structure 100 includes a first mobile unit 107. The first mobile unit 107 may be attached to the structure 100 in a manner that allows for the unit 107 to move freely around the perimeter of structure 100 in a horizontal direction. In one embodiment, the unit 107 is a vertical structure (e.g. a beam, post, etc.), which is attached to a top rail 109 of the top area 104 and/or a bottom rail 110 of the bottom area 101 such that the unit is capable of moving, via the rails 109, 110, around the perimeter of the structure 100 while facing target area 102. In one embodiment, first mobile unit 107 may include a second light source 109.

In one embodiment, the dual-camera image capture structure 100 includes a second mobile unit 108 attached to the first mobile unit 107. The second mobile unit 108 may be attached to rails on first mobile unit 107 that allow the second mobile unit 108 to move vertically along the first mobile unit 107. The second mobile light unit 108 may include a second light source 109 and a dual-camera unit 110. By horizontally moving the first mobile unit 107 and the second mobile unit, the second light source 109 and the dual-camera unit 110 may be moved to various positions around the target area 102 while continuously facing the target area 102.

In one embodiment, the second light source 109 is one or more high-intensity strobe (flash) lights. Second light source 109 may include a second diffusing filter (e.g., a flash diffuser) attached to the front of one or more lights, to diffuse the light produced by the second light source. The second diffusing filter may have a corresponding diffusion value that indicates the amount of diffusion provided by the filter. In one embodiment, the second diffusion filter of may diffuse the light produced by second light source 109 more than the light produced by the light source 105 is diffused (e.g., the diffusion value of the second diffusing filter is greater than the diffusion value of the first diffusing filter). In another embodiment, second light source 109 may not include a diffusion filter. Second light source 109 may include a polarization filter to polarize the light produced by the second light source 109.

In one embodiment, dual-camera unit 110 includes second light source 109. In another embodiment, dual-camera unit 110 and light source 109 are district units, capable of moving independently of each other. Dual-camera unit 110 is further described with respect to FIG. 2.

Figure 2:
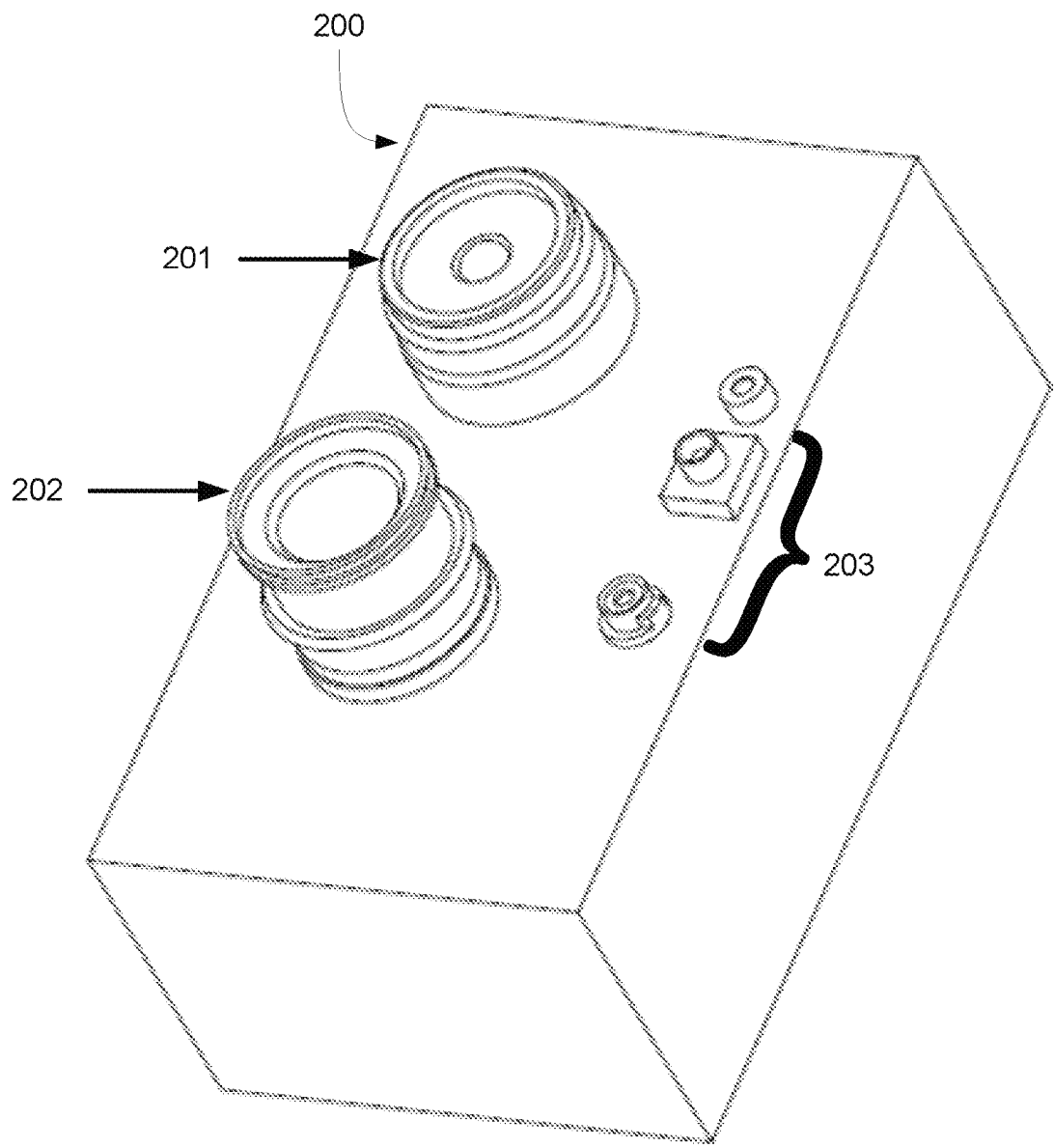
FIG. 2 is a wireframe diagram illustrating an exemplary dual-camera unit of a dual-camera image capture system, according to an implementation.

FIG. 2 is a wireframe diagram illustrating an exemplary dual-camera unit 200 of a dual-camera image capture system, according to an implementation. In one embodiment, dual-camera unit 200 includes a first camera 201 to capture structural details (e.g., structural data) of an object placed in a target area (e.g., target area 102 of FIG. 1) and a second camera 202 to capture color details (e.g., color data) of the object. The first camera and the second camera may be attached to the unit 200 and separated by a defined offset.

In one embodiment, the first camera 201 includes a monochromatic sensor (e.g., a non-color) sensor. Advantageously, a monochromatic sensor may be capable of sensing and capturing structural details at a higher resolution than a color sensor, due to the fact that filtering which is usually performed by color filter arrays employed by color image sensors may compromise the spatial resolution.

In another embodiment, first camera 201 includes a color sensor. In this embodiment, the color sensor may be configured to record data to a single color channel (e.g., the blue channel) of the sensor. First camera 201 may include a polarization filter over the lens to filter light of a defined polarization value from the sensor. In one embodiment, the polarization filter attached to the lens of first camera 201 may have an opposite polarization value as a polarization filter attached to the first light source. In one embodiment, the second camera 202 includes a color sensor, configured to capture color data on all channels of the sensor. Second camera 202 may include a polarization filter over the lens to filter light of a defined polarization value from the sensor. In one embodiment, the polarization filter attached to the lens of second camera 202 may have an opposite polarization value as a polarization filter attached to the second light source.

In one embodiment, dual-camera unit 200 may include a third camera 203 to capture depth data of an object. In one embodiment, camera 203 may be any depth sensor device capable of sensing depth data corresponding to an object. As described herein, depth data associated with an object may be used to create a target volume associated with the object. The target volume may be utilized to create an image capture scan map, as described with respect to FIGS. 4-6.

In one embodiment, the cameras described herein may include optical zoom lenses. The dual-camera image capture system may include zoom units (e.g., a series of pulleys) to operate the optical zoom lenses. Advantageously, utilizing optical zoom lenses may provide for better quality images than utilizing digital zoom.

In in one embodiment, the cameras described herein are capable of sensing and capturing both visible and non-visible light bands. Advantageously, a non-visible light pattern may be generated and reflected on an object to be scanned, and the structural camera may capture an image of the object, including the non-visible pattern, to assist in the identification of common features between images later on.

Figure 3:
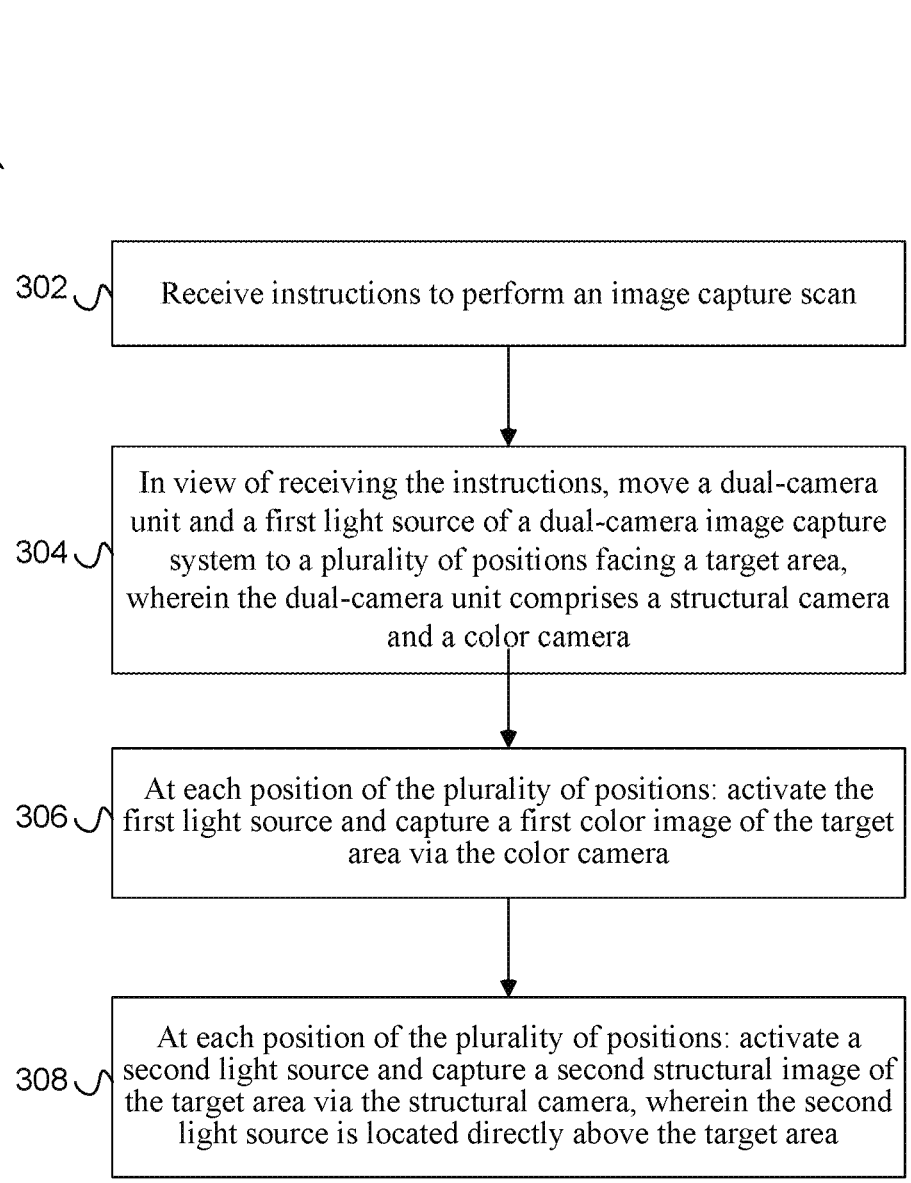
FIG. 3 is a flow diagram illustrating a method of operating a dual-camera image capture system, according to an implementation.

FIG. 3 is a flow diagram illustrating a method of operating a dual-camera image capture system, according to an implementation. The method 300 may be performed by processing logic that comprises hardware (e.g., circuitry, dedicated logic, programmable logic, microcode, etc.), software (e.g., instructions run on a processing device to perform hardware simulation), or a combination thereof. Operations of method 300 may be performed in any order so as to fit the needs of the functionality to be provided.

In one embodiment, at block 302 processing logic may receive, by a processing device of a dual-camera image capture system, instructions to perform an image capture scan. In view of receiving the instructions, processing logic may execute the instructions by causing the dual-camera image capture system to perform various operations of blocks 304-308. At block 304, processing logic may move a dual-camera unit and a first light source to various positions that face a target area. In one embodiment, wherein the dual-camera unit includes a structural camera and a color camera to take a set of images (one structural image and one color image) of an object within the target area from each position. In another embodiment, four (or more) images may be captured at each position. One color and one structure image may be captured during the first light source trigger, and then another set of color and mono images may be captured during the second, structural illumination trigger. Advantageously, when combining the image pairs in a post process operation, combining four images may better reveal details on the surface of the object being scanned. In in one embodiment, the dual image sets may be utilized to obtain accurate alignment of the images during the 3D reconstruction process (variations in lighting directionality may result in poor and/or failed camera alignment in the photogrammetry software).

At block 306, at each position, processing logic may activate (e.g., flash) the first light source and capture a first color image of the target area via the color camera and at block 308, activate (e.g., flash) a second light source and capture a second structural image of the target area via the structural camera. In one embodiment, the second light source is located directly above the target area. Processing logic may send the resulting image pairs (a structural image and a color image) to a server for processing.

Figure 4:
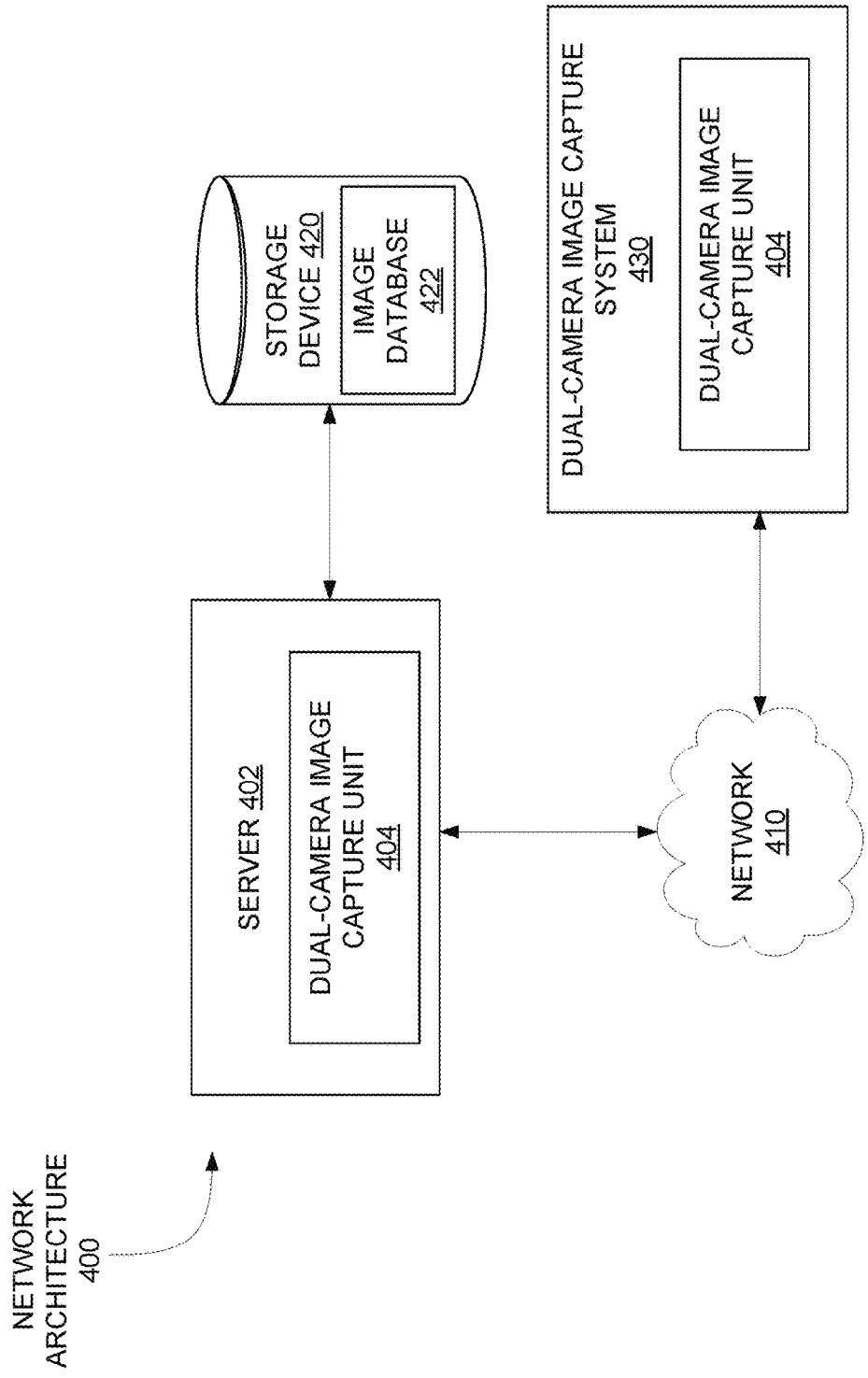
FIG. 4 is a block diagram illustrating an exemplary network architecture in which embodiments of the present disclosure may be implemented.

FIG. 4 is a block diagram illustrating an exemplary network architecture in which embodiments of the present disclosure may be implemented. The network architecture 400 may include one or more servers 402 communicating with one or more storage devices 420 and one or more dual-camera image capture units 430 over one or more networks 410, according to one embodiment. Network 410 can be a local area network (LAN), a wireless network, a telephone network, a mobile communications network, a wide area network (WAN), such as the Internet, or similar communication system. In one embodiment, network 410 is a custom 2.4 GHz wireless network optimized for fast real-time (e.g., substantially real-time) communication.

Server 402 may include various data stores, and/or other data processing equipment. The server 402 may be implemented by a single machine or a cluster of machines. Server 402 may include, for example, computer system 700 of FIG. 7. In one embodiment, server 402 includes dual-camera image capture unit 404. In another embodiment, dual-camera image capture system 430 of network architecture 400 may include dual-camera image capture unit 404. Dual-camera image capture unit 404 may perform the various operations described herein. Server 402 may be one server or it may represent multiple servers.

In one embodiment, storage device 420 and/or server 402 includes image database 422, which may include data provided by server 402 and/or dual-camera image capture unit 430. In another embodiment, data provided by server 402 and/or dual-camera image capture unit 430 is stored elsewhere, outside of image database 422 or storage device 420. In one embodiment, image database 422 may store images (e.g., pairs of structural and color images) captured by dual-camera image capture system 430. In one embodiment, server 402 may include dual-camera image capture unit 404 and storage device 420. In another embodiment, storage device 420 may be external to server 402 and may be connected to server 402 over a network or other connection. In other embodiments, server 402 may include different and/or additional components which are not shown here so as not to obscure the present disclosure. Storage device 420 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Figure 7:
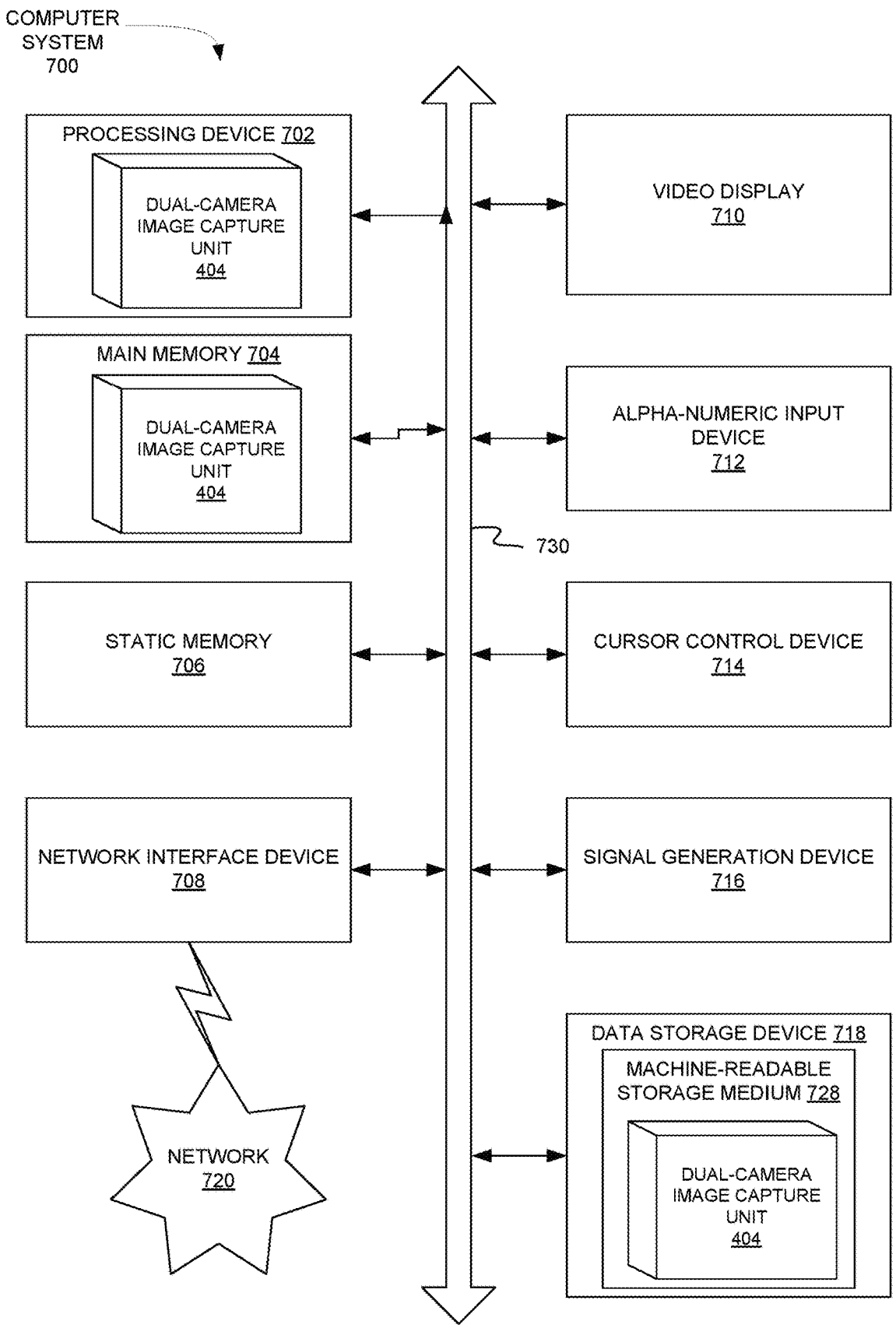
FIG. 7 is a block diagram of an example computer system that may perform one or more of the operations described herein.

In one embodiment, dual-camera image capture system 430 may include any computing device (e.g., personal computer, server, mobile device, tablet, game system, etc.) and associated dual-camera image capture hardware, as described with respect to FIGS. 1-3. Dual-camera image capture system 430 may include, for example, computer system 700 of FIG. 7 (alternatively, computer system 700 of FIG. 7 represents server 402 of FIG. 4). Dual-camera image capture unit 430 may include dual-camera image capture unit 404, which may be provided, e.g., by one or more software modules and/or one or more hardware modules. Dual-camera image capture system 430 may be connected via network 410 to other user devices and components not included in FIG. 4.

Figure 5:
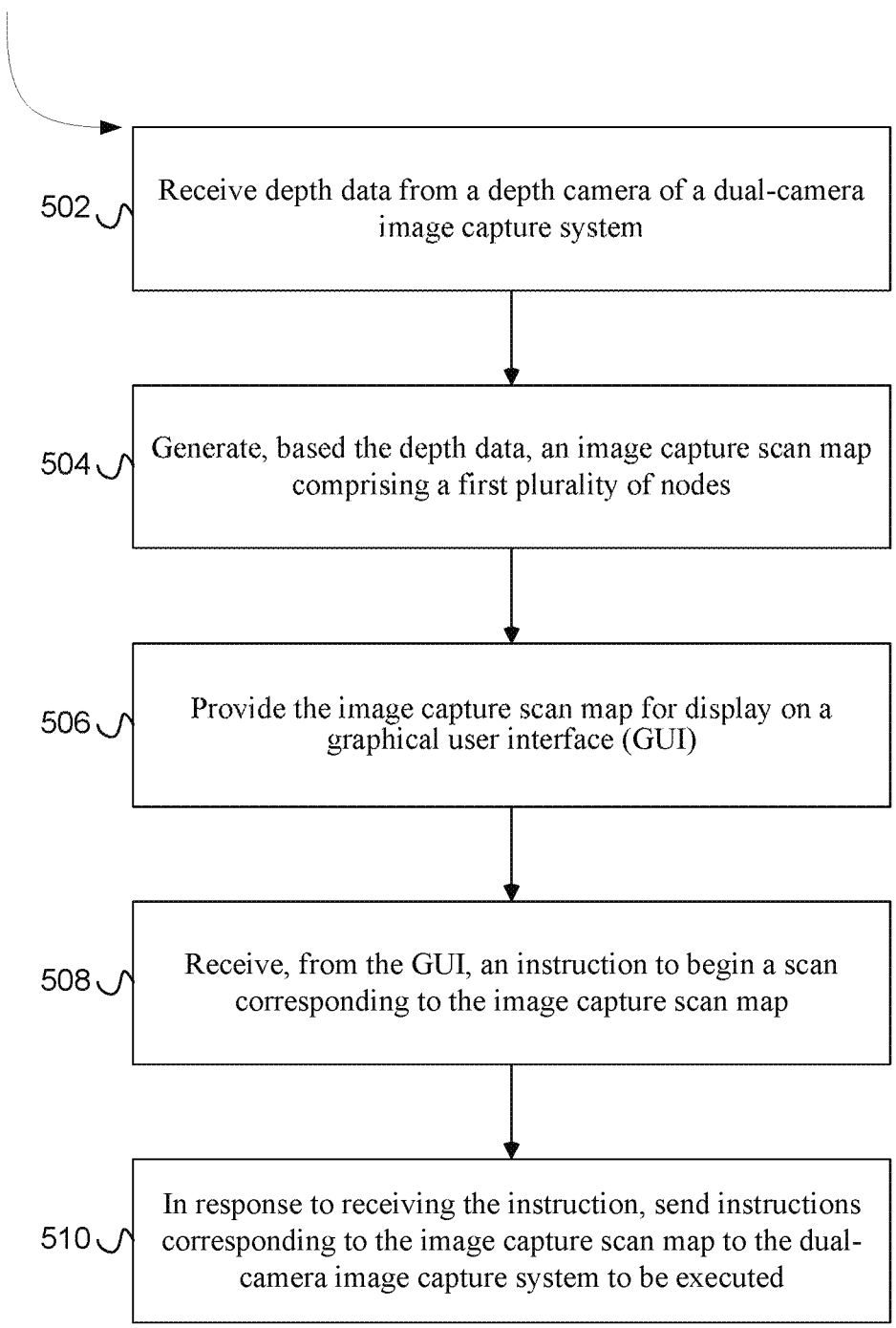
FIG. 5 is a flow diagram illustrating a dual-camera image capture method, according to an implementation.

FIG. 5 is a flow diagram illustrating a dual-camera image capture method, according to an implementation. The method 500 may be performed by processing logic that comprises hardware (e.g., circuitry, dedicated logic, programmable logic, microcode, etc.), software (e.g., instructions run on a processing device to perform hardware simulation), or a combination thereof. Method 500 can provide operations for a dual-camera image capture system. In one embodiment, dual-camera image capture unit 404 of FIG. 4 may perform method 500. Operations of method 500 may be performed in any order so as to fit the needs of the functionality to be provided.

Referring to FIG. 5, at block 502, processing logic receives, by a processing device, depth data from a depth sensor (also referred to herein as a depth camera or a structured light sensor) of a dual-camera image capture system. In one embodiment, the depth data may be associated with an object placed within a target area of the dual-camera image capture system. The depth data may include 3D positions of the exterior surface of the object in space. Processing logic may generate a target volume corresponding to the deceived depth data. The target volume may have corresponding height, width, and length parameters that define the target volume. In one embodiment, the target volume may represent the minimum volume displaced by the object to be scanned. In another embodiment, the depth data may be used to measure the distance from the object at each node position for automated focus on the front surface of the object. Advantageously, this may allow for autofocus without the aid of visible light.

At block 504, processing logic may generate, based the depth data, an image capture scan map. In one embodiment, an optimal image capture scan path is calculated in order to achieve maximum imaging coverage, while keeping the capture acquisition time to a minimum. The image capture scan map may include a first set of nodes, where each node of the first set of nodes corresponds to various characteristics including: a position, an orientation, and a zoom level of a respective structure camera and color camera of the dual-camera image capture system. For example, a node of the image capture scan map may be associated with a defined 3D position that a camera should be placed, a defined camera orientation (the angle at which a camera should be directed), a defined camera zoom level (how much should a camera lens be zoomed). In one embodiment, the structural camera and the color camera may each have separate characteristics for a node. In another embodiment, the structural camera and the color camera may share characteristics for a node.

Figure 6:
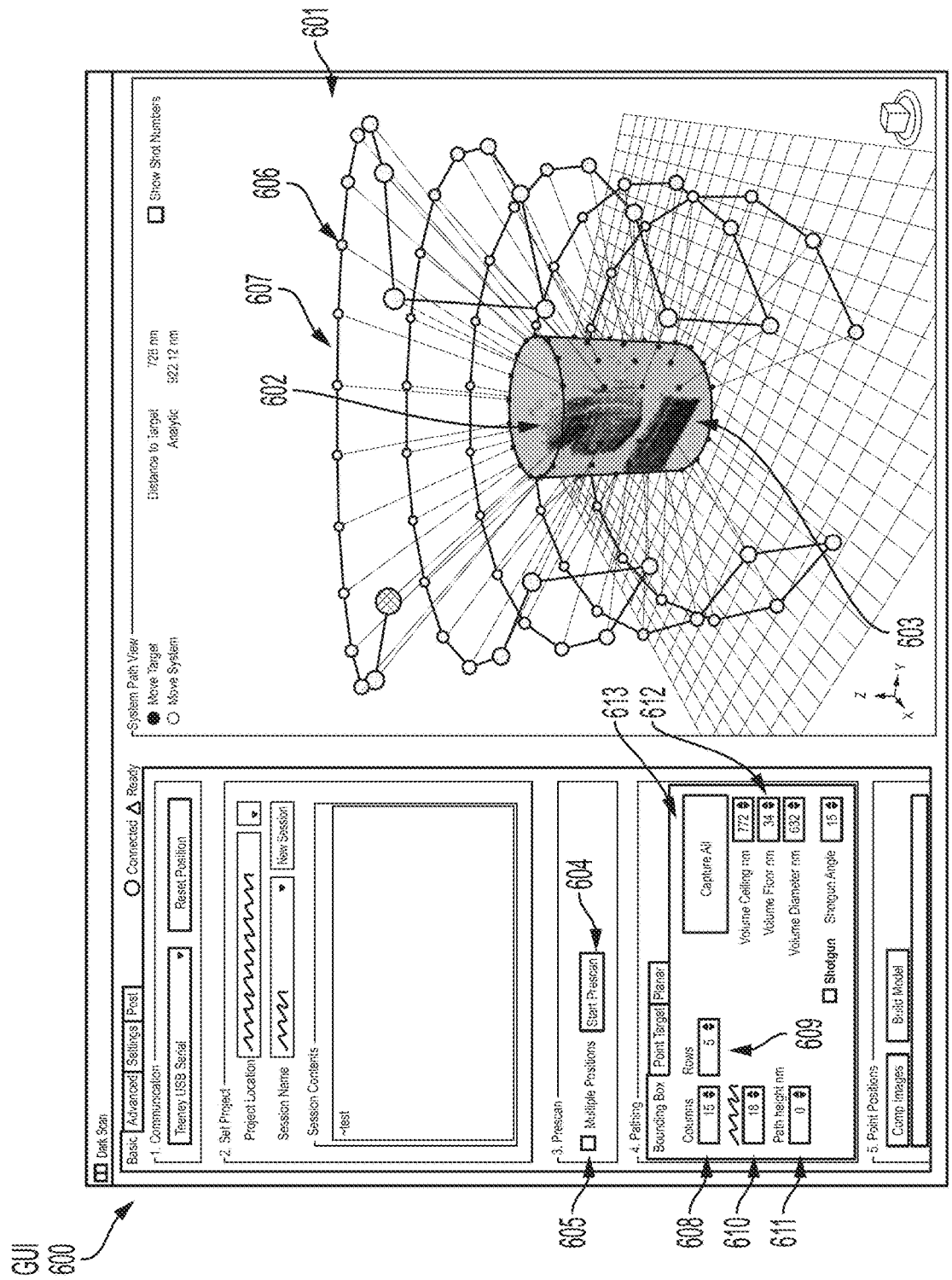
FIG. 6 is a diagram illustrating an exemplary dual-camera image capture system graphical user interface, according to an implementation.

At block 506, processing logic may provide the image capture scan map for display on a graphical user interface (GUI) (e.g., the GUI of FIG. 6). Processing logic at block 508 may receive, from the GUI, an instruction to begin a scan corresponding to the image capture scan map, and in response to receiving the instruction, send instructions corresponding to the image capture scan map to the dual-camera image capture system to be executed. In one embodiment, the image capture scan map includes a defined path that the cameras are to travel.

In one embodiment, when upon receiving the instructions corresponding to the image capture scan may, the dual-camera image capture system may automatically (e.g., without human interaction) execute the instructions causing various units of the system to move the cameras into position, modify zoom values of the cameras, modify angles of the cameras, activate (e.g., flash) light sources, etc. In one embodiment, the instructions cause the dual-camera image capture system to move from node to node (e.g., position to position), adjust characteristics specific to the current node, and capture a set of images (a first structural image from the structural camera and a second color image from the color camera). In one embodiment, the captured images may be sent to a server or client device for further processing when the scan is complete (e.g., the path associated with the image capture map is complete). In another embodiment, the captured images may be sent to the server or client device for further processing shortly after the image is captured (e.g., without waiting for the path associated with the image capture map to complete).

In one embodiment, processing logic may perform multiple scans (e.g., complete the same path multiple times) at varying zoom levels (focal lengths). For example, a first scan, capturing a first set of image pairs at each node, may be performed at 18 mm and a second scan, capturing a second set of image pairs at each node, may be performed at 35 mm. Advantageously, capturing the same image pairs at different zoom levels allows for smaller details to be captures at higher zoom levels, and larger details to be captured at larger zoom levels.

FIG. 6 is a diagram illustrating an exemplary dual-camera image capture system graphical user interface (GUI) 600, according to an implementation. In one embodiment, GUI 600 includes a first area 601 to display a visual representation of an image capture map. Area 601 may include a representation of the object to be scanned 602 (e.g., a back pack in GUI 600). Area 601 may further include a target volume representation 603 (e.g., the shaded area of 601). In one embodiment, the target volume 603 may be generated after a user activates a "pre-scan" GUI element (e.g., button 604). GUI element 605 may allow for multiple pre-scan positions. In one embodiment, at each position in space, the dual-camera image capture system may optionally pan and tilt (and zoom) each camera and capture additional images, which may cover a greater array of angles, perspectives, or detail levels of the object from the location. Advantageously, this may provide greater accuracy to the camera alignment post process step and in turn, the detail achieved in the resulting output mesh. The target volume may be modified via GUI elements 612. In one embodiment, the nodes (e.g., node 606) of the image capture map are positioned a defined distance away from the target volume. Advantageously, this may prevent dual-camera image capture system equipment from colliding with the object during a scan.

In one embodiment, a default image capture map, including nodes (e.g., node 606) and a path 607, may be generated based on depth data from the pre-scan (e.g., target volume 603) and included in GUI 600. In one embodiment, nodes may be arranged in a row and column grid formation and the path 607 may indicate the sequence of nodes to be scanned. The number of nodes may be modified using GUI elements 608 and 609, which modify the number of columns and rows of nodes, respectively. In one embodiment a scan is performed one row at a time, moving from column to column. When the current row is complete, the next row may be scanned, column by column. In another embodiment a scan is performed one column at a time, moving from row to row. When the current column is complete, the next column may be scanned, row by row. When modifications are made in GUI 600, the visual representation area 601 may be adjusted to reflect the modifications.

In one embodiment, the zoom level for a scan may be set via GUI element 610 and the height of the path may be set via GUI element 611. In one embodiment, the path height may define the height of the top row of nodes. In one embodiment, the zoom level is set on a per-scan-basis. In another embodiment, the zoom level is set on per-node-basis. In one embodiment, GUI 600 includes a "capture all" GUI element 613. Upon activation of GUI element 613, image capture map, including path 607, nodes, node characteristics, and other characteristics defined via GUI 600 may be sent to the dual-camera image capture system for execution of the scan.

FIG. 7 illustrates a diagrammatic representation of a computing device 700 which may implement the systems and methods described herein. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute dual-camera image capture unit 404 implementing methods 300 and 500 for carrying out dual-camera image capture operations, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions of dual-camera image capture unit 404 implementing methods 300 and 500 for carrying out dual-camera image capture operations, in accordance with one or more aspects of the present disclosure. Instructions implementing module 726 may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "executing," "moving," "activating," "generating," "providing," "sending," "modifying," "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. An image capture system, comprising:
   a first mobile unit configured to move horizontally around a target area;
   a second mobile unit adjustably coupled to the first mobile unit, the second mobile unit configured to move vertically along the first mobile unit;
   a multi-camera unit, operatively coupled to the second mobile unit, the multi-camera unit comprising a first camera to capture structural data a second camera to capture color data;
   wherein the first mobile unit and the second mobile unit are configured to move the first camera and the second camera through a plurality of positions facing the target area.

2. The image capture system of claim 1, wherein the first camera comprises a monochromatic sensor configured to capture the structural data.

3. The image capture system of claim 1, wherein the first camera comprises a first polarizing filter.

4. The image capture system of claim 1, wherein the second camera comprises a second polarizing filter.

5. The image capture system of claim 1, further comprising:
a third camera configured to capture depth data.

6. The image capture system of claim 1, wherein aperture and shutter speed of the first camera and the second camera are set to filter out ambient light.

7. The image capture system of claim 1, further comprising:
a stationary platform disposed in the target area to support a target object.

8. The image capture system of claim 1, wherein the first camera is configured to capture both visible and invisible light bands.

9. The image capture system of claim 1, wherein the first camera produces images of higher resolution than the second camera.

10. The image capture system of claim 1, wherein the second camera is configured to record data of a specified color channel.

11. A method, comprising:
receiving, by a processing device, an image capture system, a command to capture an image;
causing a first mobile unit of the image capture system to be moved horizontally around a target area;
causing a second mobile unit adjustably coupled to the first mobile unit to be moved vertically with respect to the first mobile unit, thus causing a multi-camera unit operatively coupled to the second mobile unit to consecutively face the target area from each position of a plurality of positions, wherein the multi-camera unit comprises a structural camera and a color camera;
at each position of the plurality of positions:
causing a color image of the target area to be captured by the color camera; and
causing a structural image of the target area to be captured by the structural camera.

12. The method of claim 11, wherein the structural camera comprises a monochromatic sensor configured to capture the structural image.

13. The method of claim 11, wherein the color camera comprises a color sensor configured to capture the color image.

14. The method of claim 11, wherein at least one of: a scale of the captured structural image or an orientation of the captured structural image corresponds to respective pre-defined settings.

15. The method of claim 11, further comprising:
setting aperture values and shutter speed values of the structural camera and the color camera to filter out ambient light.

16. A computer-readable non-transitory storage medium comprising executable instructions that, when executed by a processing device of an image capture system, cause the processing device to:
receive a command to capture an image;
cause a first mobile unit of the image capture system to be moved horizontally around a target area;
cause a second mobile unit adjustably coupled to the first mobile unit to be moved vertically with respect to the first mobile unit, thus causing a multi-camera unit operatively coupled to the second mobile unit to consecutively face the target area from each position of a plurality of positions, wherein the multi-camera unit comprises a structural camera and a color camera;
at each position of the plurality of positions:
cause a color image of the target area to be captured by the color camera; and
cause a structural image of the target area to be captured by the structural camera.

17. The computer-readable non-transitory storage medium of claim 16, wherein the structural camera comprises a monochromatic sensor configured to capture the structural image.

18. The computer-readable non-transitory storage medium of claim 16, wherein the color camera comprises a color sensor configured to capture the color image.

19. The computer-readable non-transitory storage medium of claim 16, wherein at least one of: a scale of the captured structural image or an orientation of the captured structural image corresponds to respective pre-defined settings.

20. The computer-readable non-transitory storage medium of claim 16, further comprising executable instructions that, when executed by the processing device, cause the processing device to:
setting aperture and shutter speed of the structural camera and the color camera to filter out ambient light.

* * * * *